(12) United States Patent
Tang et al.

(10) Patent No.: US 11,914,418 B2
(45) Date of Patent: Feb. 27, 2024

(54) SYSTEMS, METHODS, AND APPARATUSES FOR PERFORMING HIGH-SPEED DATA ACQUISITION AND MAINTAINING DATA INTEGRITY

(71) Applicant: Gree Electric Appliances, Inc. of Zhuhai, Guangdong (CN)

(72) Inventors: Jiangxun Tang, Guangdong (CN); Qiao Huang, Guangdong (CN); Yuqing Nie, Guangdong (CN)

(73) Assignee: Gree Electric Appliances, Inc. of Zhuhai, Guangdong (CN)

( * ) Notice: Subject to any disclaimer, the term of this patent is extended or adjusted under 35 U.S.C. 154(b) by 100 days.

(21) Appl. No.: 17/624,821

(22) PCT Filed: Jun. 17, 2020

(86) PCT No.: PCT/CN2020/096629
§ 371 (c)(1),
(2) Date: Jan. 4, 2022

(87) PCT Pub. No.: WO2021/036431
PCT Pub. Date: Mar. 4, 2021

(65) Prior Publication Data
US 2022/0317724 A1    Oct. 6, 2022

(30) Foreign Application Priority Data

Aug. 26, 2019    (CN) .......................... 201910790289.4

(51) Int. Cl.
*G06F 1/00*    (2006.01)
*G06F 1/14*    (2006.01)
(Continued)

(52) U.S. Cl.
CPC .................. *G06F 1/14* (2013.01); *G06F 1/10* (2013.01); *G06F 1/3206* (2013.01)

(58) Field of Classification Search
CPC . G05F 1/10; G05F 1/14; G05F 1/3206; G05B 19/042
See application file for complete search history.

(56) References Cited

U.S. PATENT DOCUMENTS

| 5,719,511 A | 2/1998 | Cornec et al. |
| 2007/0216456 A1* | 9/2007 | Kook .................... H03L 7/0818 |
| | | 327/158 |

(Continued)

FOREIGN PATENT DOCUMENTS

| CN | 1983225 | 6/2007 |
| CN | 101587499 | 11/2009 |

(Continued)

OTHER PUBLICATIONS

Cheng Changyan, "Design of Ground Penetrating Radar Data Acquisition System Based on FPGA—基于FPGA 的探地雷达数据采集系统设计,"Radio Engineering, 2017, 4:28-30, 1 page (English Abstract Only).

(Continued)

*Primary Examiner* — Nitin C Patel
(74) *Attorney, Agent, or Firm* — Fish & Richardson P.C.

(57) ABSTRACT

A data acquisition system and a control method, apparatus, and device therefor, and a medium. The data acquisition system comprises: a signal transmission line, the signal transmission line having multiple first signal delay units connected in series, and the output end of each of the first signal delay units forming an acquisition point; multiple acquisition units, the acquisition units being connected to the acquisition points of the first signal delay units to acquire signals at the acquisition points; a clock unit, configured to generate a control signal; a comparison unit, configured to compare the period of the control signal with the period of a standard signal, and generate an adjustment signal according to the comparison result; and an adjustment unit, con- (Continued)

figured to adjust a power supply voltage for the signal transmission line and the clock unit according to the adjustment signal, so that the ratio of the period of the control signal to the period of the standard signal meets a set threshold range.

10 Claims, 6 Drawing Sheets

(51) Int. Cl.
    *G06F 1/10*         (2006.01)
    *G06F 1/3206*     (2019.01)

(56) References Cited

U.S. PATENT DOCUMENTS

2013/0145060 A1*   6/2013   Guo .................... G06F 13/387
                                                                         710/58
2015/0059432 A1    3/2015   Zhuge et al.

FOREIGN PATENT DOCUMENTS

| | | |
|---|---|---|
| CN | 201654786 U | 11/2010 |
| CN | 101477581 | 5/2011 |
| CN | 103136146 | 6/2013 |
| CN | 107359947 | 11/2017 |
| CN | 107861412 | 3/2018 |
| CN | 109714145 | 5/2019 |
| CN | 110647067 | 1/2020 |
| JP | H0758644 A | 3/1995 |

OTHER PUBLICATIONS

CN Office Action in Chinese Appln. No. 201910790289.4, dated Jun. 1, 2020, 11 pages (with English Translation).
CN Office Action in Chinese Appln. No. 201910790289.4, dated Sep. 11, 2020, 4 pages (with English Translation).
International Preliminary Report on Patentability in International Appln. No. PCT/CN2020/096629, dated Mar. 1, 2022, 13 pages (with English Translation).
Kuojun, "Algorithm based on TDC to estimate and calibrate delay between channels of high-speed data acquisition system", IEEE 2011 10th International Conference on Electronic Measurement & Instruments, Aug. 2011, pp. 221-224.
Written Opinion in International Appln. No. PCT/CN2020/096629, dated Sep. 22, 2020, 11 pages (with English Translation).
International Search Report in International Appln. No. PCT/CN2020/096629, dated Sep. 22, 2020, 6 pages (with English Translation).

* cited by examiner

SYSTEMS, METHODS, AND APPARATUSES FOR PERFORMING HIGH-SPEED DATA ACQUISITION AND MAINTAINING DATA INTEGRITY

CROSS-REFERENCE TO RELATED APPLICATIONS

This application is a U.S. National Phase application under 35 U.S.C. § 371 of International Patent Application No. PCT/CN2020/096629, filed on Jun. 17, 2020, which claims priority of Chinese patent application No. 201910790289.4 filed on Aug. 26, 2019, entitled "DATA ACQUISITION SYSTEM AND CONTROL METHOD, DEVICE, APPARATUS THEREFOR, AND MEDIUM", the entire contents of which are incorporated herein by reference.

TECHNICAL FIELD

The present disclosure relates to the field of data acquisition, and in particular relates to data acquisition system and method, device, apparatus for controlling the same, and medium.

BACKGROUND

Data acquisition has higher and higher requirements for data speed performance, high-speed data acquisition systems have been widely used in automation control, electrical measurement, and aerospace engineering practices.

Generally, a high-speed acquisition system has two parts—a data acquisition part and a data processing part. During data acquisition, data will be acquired at a very high speed and the acquired data are stored in the buffer, and the data are extracted from the buffer to be processed when the processing unit is idle.

In the high-speed data acquisition system, data are acquired at a very high speed, while both the time for storage in the buffer and the storage capacity are limited. In the case that the processing unit is in full usage or the data to be processed are overwhelming, the data would be processed at a slow speed, in that case, the data stored in the buffer may be discarded before they reach the processing unit, resulting in data loss and incomplete data acquisition. Also, during data acquisition, a period of the acquisition signal for data acquisition may be changed due to the influence of the environment and temperature of the acquisition circuit in the acquisition system.

In summary, the inventor realizes that, incomplete data acquisition and changes in a period of the acquired signal may occur to the above-mentioned data acquisition system known to the inventor.

SUMMARY

In an embodiment of the present disclosure, there is provided a data acquisition system, which is used to achieve high-speed data acquisition while ensuring the integrity of the collected data and acquisition of data with a correct period.

According to an aspect of the present disclosure, an embodiment provides a data acquisition system, which includes:

a signal transmission line, which includes a plurality of first signal delay units connected in series, an output end of each first signal delay unit 11 forms an acquisition end;

a plurality of acquisition units, each of the acquisition units corresponds to a respective one of the first signal delay units respectively, in each pair of corresponding acquisition unit and first signal delay unit, the acquisition unit is connected to the acquisition end of the first signal delay unit to collect signals at the acquisition end;

a clock unit connected to the acquisition units, the clock unit includes a first inversion unit and a plurality of second signal delay units; the first inversion unit and the plurality of second signal delay units are connected in series together; the second signal delay unit is structurally the same as the first signal delay unit; the clock unit is configured to generate a control signal for controlling a time for signal acquisition of the acquisition unit;

a comparison unit connected to the clock unit, the comparison unit is configured to perform a comparison on a period of a control signal with a period of a standard signal, and to generate an adjustment signal based on the comparison; and an adjustment unit connected to the comparison unit, the adjustment unit is configured to adjust supply voltage for the signal transmission line and the clock unit based on the adjustment signal, such that a ratio of the period of the control signal to the period of the standard signal is within a predetermined threshold range.

In the data acquisition system according to embodiments of the present disclosure, signals are transmitted through the transmission line with a plurality of signal delay units, before being acquired by the acquisition unit, thus delaying the transmission of the signals. In some embodiments, a time interval is set between two data acquisitions to ensure that the uncollected signals are still being transmitted on the signal transmission line. In some embodiments, complete signals are acquired to ensure that there is enough time for the processing unit to process the signals acquired by the acquisition unit. As compared to the existing data acquisition system, the data acquisition system according to the present disclosure guarantees the integrity of the collected signals. In addition to this, a clock unit comprised of second signal delay units each having the same structure as the first signal delay unit, is arranged on the signal transmission line, to prevent the transmission time of the signal transmission line from being affected by the operating environment. And comparison is performed on a control signal generated by the clock unit with a period of a standard clock signal. Based on the comparison, a delay offset of the second signal delay unit is determined. And based on the delay offset of the second signal delay unit, compensation is performed on the power supply voltage for the first signal delay unit and the second signal delay unit, such that, the delay of the first signal delay unit and the second signal delay unit can be fixed.

In a possible implementation, in the above-mentioned data acquisition system according to an embodiment of the present disclosure, the number of the first signal delay units connected in series in the signal transmission line is equal to that of the second signal delay units connected in series in the clock unit.

In the data acquisition system according to an embodiment of the present disclosure, the amount of the first signal delay units connected in series in the signal transmission line is the same as the amount of the second signal delay units connected in series in the clock unit, and the first signal delay unit is structurally the same as the second signal delay unit. And thus, the transmission time offset over the signal transmission line as introduced by the first signal delay units, is the same as the clock offset of the clock units. Thereby, compensation is performed on the power supply voltage for the first signal delay unit and the second signal delay unit, so as to collect signals with a correct period.

In a possible implementation, in the above-mentioned data acquisition system according to an embodiment of the present disclosure, the clock unit further includes a switch unit connected to an output end of any one of the second signal delay units, and the switch unit is configured to control a connection between a second signal delay unit and an input end of a first inversion unit.

In the above-mentioned data acquisition system according to an embodiment of the present disclosure, the output end of each second signal delay unit is connected with a switch unit configured to control the connection between the output end of the second signal delay unit and the input end of the inversion unit. A period of an output control signal varies with various connections between an output end of the second signal delay unit and an input end of the inversion unit. The specific state of each switch unit can be set according to the operating conditions of the acquisition unit and the processing unit that processes the signal to obtain control signals of different periods to meet the requirements of the acquisition system.

In a possible implementation, in the above-mentioned data acquisition system according to an embodiment of the present disclosure, the comparison unit includes a first adder, a second adder, and a comparator unit.

The first adder is configured to receive clock signals sent by a preset clock device and to accumulate the number of the clock signals.

The second adder is configured to receive control signals and to accumulate the number of control signals.

The comparator unit is connected to the first adder and the second adder respectively, and is configured to perform a comparison on the number of the accumulated clock signal of the first adder and the number of the accumulated control signals of the second adder and to generate an adjustment signal based on the comparison.

In the data acquisition system according to an embodiment of the present disclosure, the number of periods of the generated control signals and the number of periods of the clock signals generated by the preset clock device are accumulated. An offset of the period of the control signals is determined based on a comparison between the numbers of periods. An adjustment is performed on the power supply voltage for the first signal delay unit and the second signal delay unit, to ensure that the transmission time of a signal transmitted through each first delay unit over the signal transmission line is unchanged, so as to ensure that the period of the collected signal is stable and unchanged.

In a possible implementation, in the above-mentioned data acquisition system according to an embodiment of the present disclosure, the adjustment unit includes a comparator, a sliding variable resistor, a metal-oxide-semiconductor (MOS) field-effect transistor, and a first resistor.

A first input end of the comparator is connected to a standard power supply, a second input end of the comparator is connected to a second end of the sliding variable resistor, and an output end of the comparator is connected to the gate electrode of the MOS transistor.

The source electrode of the MOS transistor is connected to a power supply, and the drain electrode of the MOS transistor is connected to a sliding sheet of the sliding variable resistor.

The sliding sheet of the sliding variable resistor is connected to an output end of the comparator unit, and a second end of the sliding variable resistor is connected to the first resistor.

A second end of the first resistor is connected to the ground.

In a possible implementation, in the above-mentioned data acquisition system according to an embodiment of the present disclosure, the input end of the signal transmission line includes a second inversion unit.

The second inversion unit is structurally the same as the first inversion unit.

According to another aspect of the present disclosure, an embodiment of the present disclosure provides a method for controlling a data acquisition system, including:

receiving signals sent at different moments by an acquisition unit;

calculating a processing time for each received signal; and transmitting an instruction signal to the clock unit based on the processing time for each signal; wherein, the instruction signal is used to control an operating state of a switch unit arranged at an output end of a second signal delay unit, such that the clock unit is caused to transmit a control signal to the acquisition unit, and the control signal is used to control the acquisition unit to acquire a signal at an acquisition end.

In the method for controlling the data acquisition system according to an embodiment of the present disclosure, a processing time for a received signal from the acquisition unit processed by the processing unit, is detected in real-time during the transmission of the signal over the signal transmission line. Control signals of different moments are transmitted to the acquisition unit to cause the acquisition unit to collect data at different moments, so as to avoid that the processing device receives several identical data and avoid wasting the resources and time of the device for processing the collected signals.

In yet another aspect of the present disclosure, an embodiment provides a device for controlling a data acquisition system, including:

a receiving unit configured to receive signals sent at different moments by an acquisition unit;

a calculation unit configured to calculate a processing time for each received signal; and a transmission unit configured to transmit an instruction signal to a clock unit based on the processing time for each signal; wherein the instruction signal is used to control an operating state of the switch unit arranged at an output end of a second signal delay unit, such that the clock unit is caused to transmit a control signal to the acquisition unit, the control signal is used to cause the acquisition unit to acquire signals at an acquisition end.

In yet another aspect of the present disclosure, an embodiment provides an apparatus for controlling a data acquisition system, including at least one processor, at least one memory, and computer program instructions stored in the memory, wherein the computer program instructions, when executed by the processor, implement the method for controlling the data acquisition system according to the above-mentioned aspect of the present disclosure.

In yet another aspect of the present disclosure, an embodiment provides a computer-readable storage medium having computer program instructions stored thereon, wherein, the computer program instructions, when executed by a processor, implement the method for controlling the data acquisition system according to the above-mentioned aspect of the present disclosure.

BRIEF DESCRIPTION OF DRAWINGS

The accompanying drawings, as a part of the specification, are intended to provide a further understanding of the present disclosure, and an interpretation to the present disclosure in conjunction with the embodiments of the present disclosure, but shall not be considered as a limitation to the present disclosure. In the drawings.

DETAILED DESCRIPTION

The embodiments of the present disclosure will be described below with reference to the accompanying drawings. It should be understood that the embodiments described herein are intended only for illustration and explanation of the present disclosure, but are not intended for limitations of the present disclosure.

Detailed embodiments of the data acquisition system according to embodiments of the present disclosure will be described in conjunction with the accompanying drawings below.

Figure 1:
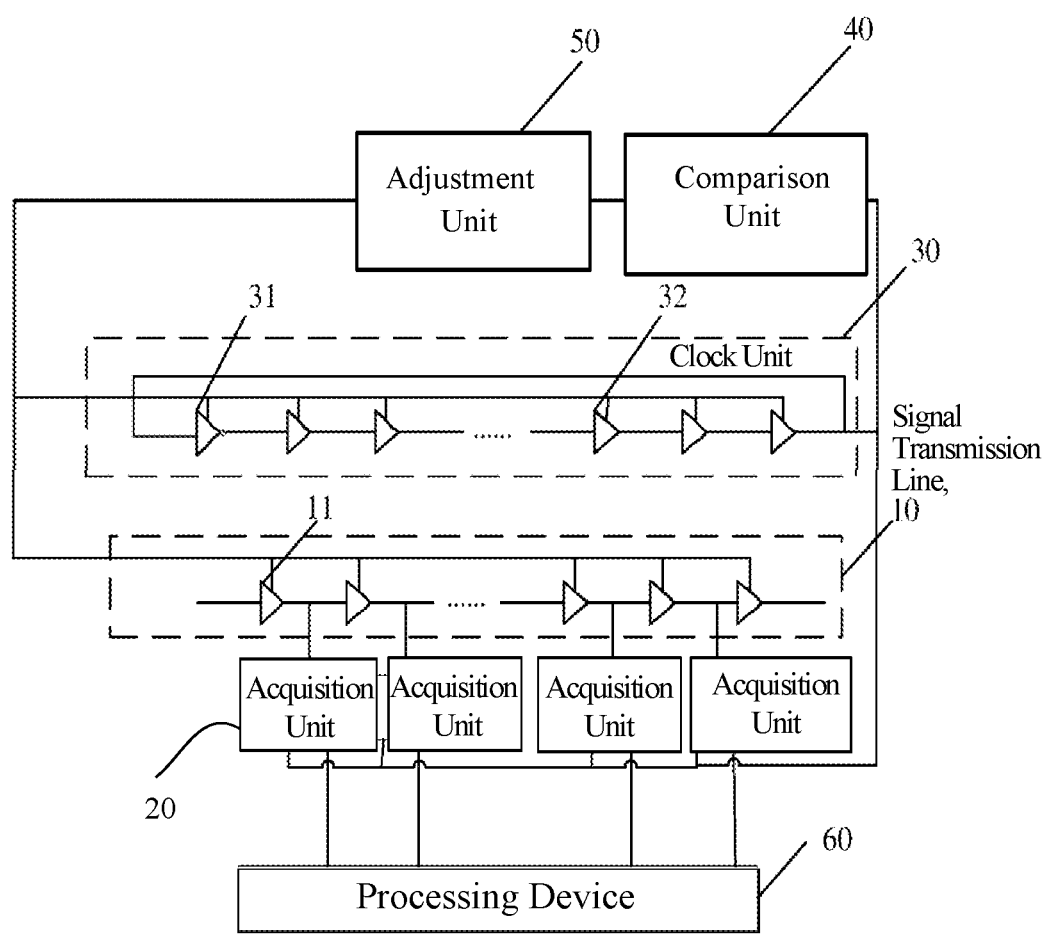
FIG. 1 is a first schematic diagram of a data acquisition system according to an embodiment of the present disclosure.

As shown in FIG. 1, an embodiment of the present disclosure provides a data acquisition system, which includes:

a signal transmission line 10, which includes a plurality of first signal delay units 11 connected in series, an output end of each first signal delay unit 11 forms an acquisition end;

a plurality of acquisition units 20, each of the acquisition units 20 corresponds to a respective one of the first signal delay units 11 respectively; in each pair of the corresponding acquisition unit 20 and first signal delay unit 11, the acquisition unit 20 is connected to the acquisition end of the first signal delay unit 11 to collect signals at the acquisition end;

a clock unit 30 connected to the acquisition units, the clock unit includes a first inversion unit 31 and a plurality of second signal delay units 32; the first inversion unit 31 and the plurality of second signal delay units 32 are connected in series together; the second signal delay unit 32 is structurally the same as the first signal delay unit 11; the clock unit is configured to generate a control signal for controlling a time for signal acquisition of the acquisition unit 20;

a comparison unit 40 connected to the clock unit 30, the comparison unit 40 is configured to perform a comparison on a period of a control signal with a period of a standard signal, and to generate an adjustment signal based on the comparison; and an adjustment unit 50 connected to the comparison unit 40, the adjustment unit 50 is configured to adjust supply voltage for the signal transmission line 10 and the clock unit 30 based on the adjustment signal, such that a ratio of the period of the control signal to the period of the standard signal is within a predetermined threshold range.

It should be noted that the predetermined threshold range may be set based on a requirement of collection accuracy for the data collection system or on device specifications of the collection system, but it is not intended to limit this in the embodiments of the present disclosure.

In a possible implementation, the number of first signal delay units 11 connected in series in the signal transmission line 10 is the same as the number of second signal delay units 32 connected in series in the clock unit 30.

The number of the first signal delay units 11 on the signal transmission line 10 may be determined based on the application scene of the data acquisition system, the connected devices, the processing speed of the processing device 60, and the delay of the first signal delay unit 11, but it is not intended to limit this in the embodiments of the present disclosure.

It should be noted that the delay of each first signal delay unit 11 shall be less than or equal to half of the duration of the high-level of a signal input to the signal transmission line 10, to ensure that the signal is completely passed through the first signal delay units 11.

In some embodiments, the processing device 60 in FIG. 1 as provided by the embodiment of the present disclosure is a processing device that is in communication connection or in electrical connection with the data acquisition system. In other embodiments, a processing device is provided in the acquisition system as provided in the embodiment of the present disclosure, and the processing device is configured to process the signals collected by the acquisition units 20.

In some embodiments of the present disclosure, the first signal delay unit 11 provided in the embodiments of the present disclosure has three variations due to differences in the delay and in the device for the delay, which will be specifically described with three cases below.

Case 1, the first signal delay unit 11 includes a first resistor and a first capacitor.

A first end of the first resistor is connected to an output end of a preceding one delay circuit, a second end of the first resistor is connected to both a first end of the first capacitor and an input end of a subsequent one delay circuit. A second end of the first capacitor is connected to the ground.

It should be noted that the specifications of the first resistor and the first capacitor may be selected based on the delay of the first signal delay unit 11, but it is not intended to limit this in the embodiments of the present disclosure.

Figure 2:
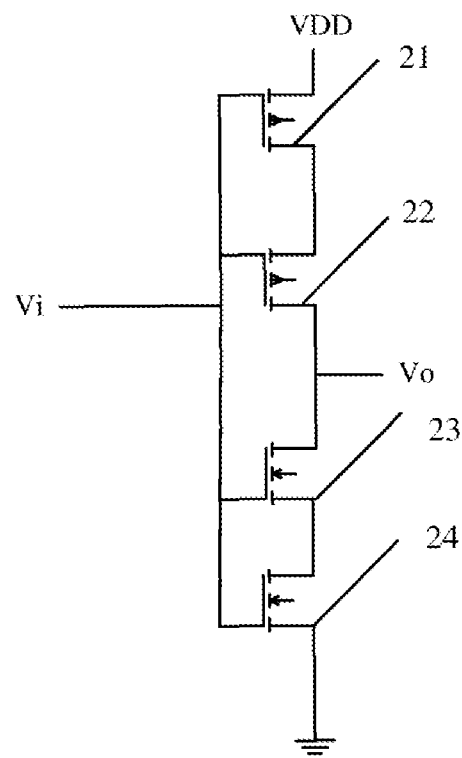
FIG. 2 is a first schematic diagram of a circuit of a first signal delay unit according to an embodiment of the present disclosure.

Case 2, as shown in FIG. 2, the first signal delay unit 11 according to an embodiment of the present disclosure includes a first metal-oxide-semiconductor (MOS) field-effect transistor 21 and a second MOS transistor 22, a third MOS transistor 23, and a fourth MOS transistor 24.

Specifically, the source electrode of the first MOS transistor 21 is connected to the power supply, the gate electrode of the first MOS transistor 21 is connected to an output end of a preceding one delay circuit, and the drain electrode of the first MOS transistor 21 is connected to the source electrode of the second MOS transistor 22. The gate electrode of the second MOS transistor 22 is connected to an output end of a preceding one delay circuit, the drain electrode of the second MOS transistor 22 is connected to the drain electrode of the third MOS transistor 23. The gate electrode of the third MOS transistor 23 is connected to an output end of a preceding one delay circuit, the source electrode of the third MOS transistor 23 is connected to the drain electrode of the fourth MOS transistor 24. The gate electrode of the fourth MOS transistor 24 is connected with an output end of a preceding one delay circuit, and the source electrode of the fourth MOS transistor is connected to the ground.

It should be noted that the type of the first, second, third, and fourth MOS transistors in the first signal delay unit 11 according to an embodiment of the present disclosure may be selected based on the delay of the first signal delay unit 11, but it is not intended to limit this in the embodiments of the present disclosure.

Figure 3:
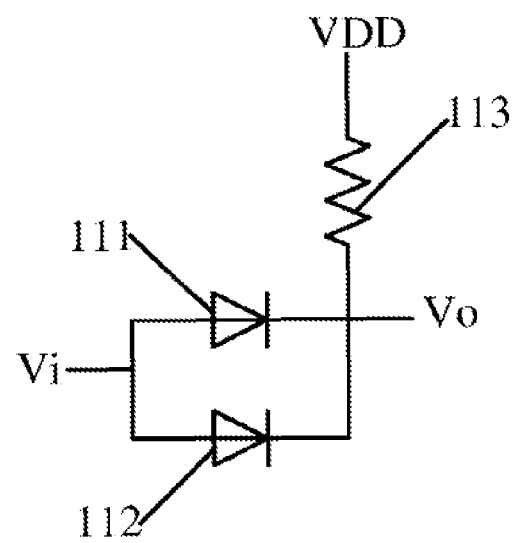
FIG. 3 is a second schematic diagram of the circuit of the first signal delay unit according to an embodiment of the present disclosure.

Case 3, as shown in FIG. 3, the first signal delay unit 11 according to an embodiment of the present disclosure includes a first diode 111, a second diode 112, and a second resistor 113.

Specifically, the anode of the first diode 111 is connected to an output end of a preceding one first signal delay unit, the cathode of the first diode 111 is connected to a second end of the second resistor 113. The anode of the second diode 112 is connected to an output end of a preceding one first signal delay unit, the cathode of the second diode 112 is connected to a second end of the second resistor 113. A first end of the second resistor 113 is connected to a power supply, and a second end of the second resistor 113 is connected to an input end of a subsequent one first signal delay unit.

It should be noted that the types of the first diode 111, the second diode 112, and the second resistor 113 in this embodiment may be selected based on the delay of the first signal delay unit 11, but it is not intended to limit this in the embodiments of the present disclosure.

It should be noted that, in order to reduce the dimension and power consumption of the data acquisition system, the three cases of the first signal delay unit 11 according to some embodiments of the present disclosure are implemented as integrated circuits, but it is not intended to limit this in the embodiments of the present disclosure.

In another embodiment of the present disclosure, the first signal delay unit 11 may be implemented as another circuit or device that is able to perform signal delay, but it is not intended to limit this in the embodiments of the present disclosure.

In a possible implementation, a second inversion unit is provided at an input end of the signal transmission line in order to avoid distortion of a signal caused by electromagnetic interference before the signal is transmitted to the signal transmission line.

It should be noted that the first inversion unit is structurally the same as the second inversion unit.

Figure 4:
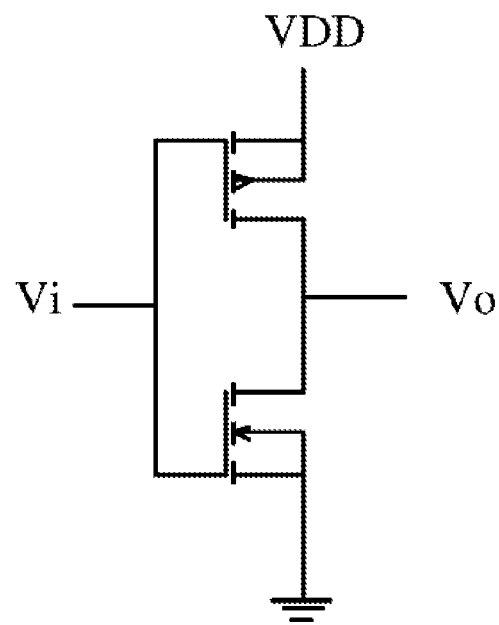
FIG. 4 is a schematic diagram of a circuit of a first inversion unit according to an embodiment of the present disclosure.

In a possible implementation, as shown in FIG. 4, the second inversion unit includes a complementary metal-oxide-semiconductor, CMOS inverter.

In an example, an input end of the signal transmission line includes two second inverting units.

CMOS inverter integrated circuit is preferably used in the embodiments of the present disclosure to reduce the loss of the data acquisition system.

It should be noted that in other embodiments of the present disclosure, the second inversion unit may be implemented as other devices or circuits that can perform the inverting function, but it is not intended to limit this in the present disclosure.

In a possible implementation, the acquisition unit 20 includes a D flip-flop. An input end of the D flip-flop is connected to an output end of the first signal delay unit 11, and an output end of the D flip-flop is connected to a processing unit 30. A control end of the D flip-flop receives a control signal for controlling the time for signal acquisition of the acquisition unit 20.

It should be noted that, in order to avoid collection failure caused by signal being still on the first signal delay unit, the duration for signal collection of the collection unit is set to be different from the delay of the signal delay unit to ensure that a complete signal is collected.

In an example, the control end of the D flip-flop is connected to the clock unit to receive a control signal sent by the clock unit, and to collect the signal at the acquisition end based on the received control signal.

Figure 5:
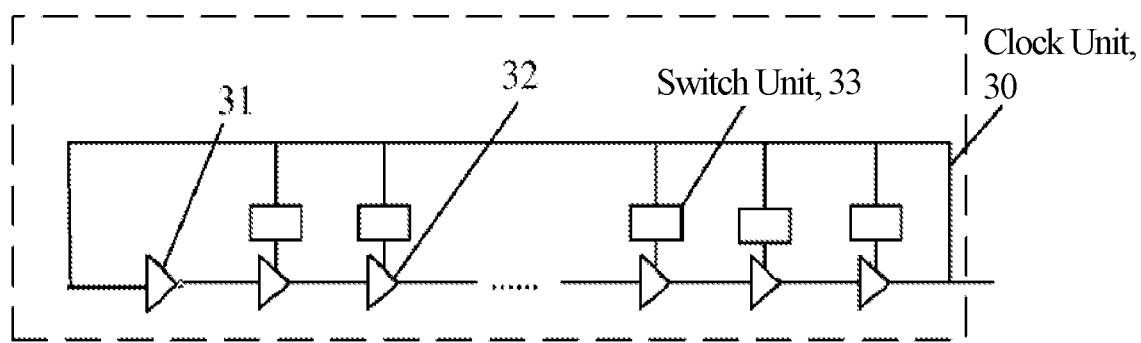
FIG. 5 is a schematic diagram of a switch unit according to an embodiment of the present disclosure.

In a possible implementation, as shown in FIG. 5, the clock unit 30 configured to generate a control signal, further includes a switch unit 33 connected to an output end of any one second signal delay unit 32 in the clock unit 30. The switch unit 33 is configured to control a connection between the second signal delay unit 32 and an input end of the inversion unit 31.

Figure 6:
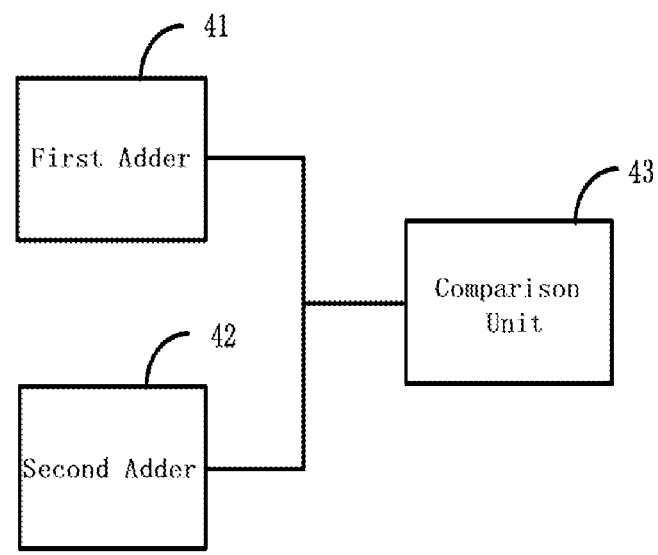
FIG. 6 is a schematic diagram of a comparison unit according to an embodiment of the present disclosure.

In a possible implementation, as shown in FIG. 6, the comparison unit 40 provided in an embodiment of the present disclosure includes:

a first adder 41, a second adder 42, and a comparator unit 43. The first adder 41 is configured to receive clock signals sent by a preset clock device and to accumulate the number of the clock signals. The second adder 42 is configured to receive control signals and to accumulate the number of control signals. The comparator unit 43 is connected to the first adder 41 and the second adder 42, and is configured to perform a comparison on the number of the accumulated clock signal of the first adder 41 and the number of the accumulated control signals of the second adder 42 and to generate an adjustment signal based on the comparison.

It should be noted that in some embodiments of the present disclosure, the clock device is a crystal oscillator. The specific type of crystal oscillator may be selected based on the requirements of the data acquisition system and the accuracy of the crystal oscillator, but it is not intended to limit this in the embodiments of the present invention.

In some embodiments of the present disclosure, the clock device is provided in the data acquisition system according to an embodiment of the present disclosure. In some other embodiments, the clock device is a device in communication with the data acquisition system provided in the embodiments of the present disclosure, but it is not intended to limit this in the embodiments of the present disclosure.

It should be noted that the total number of the first adder 41 and the second adder 42 may be set according to actual requirements such as the acquisition accuracy required by the data acquisition system, but it is not intended to limit this in the embodiments of the present disclosure.

Figure 7:
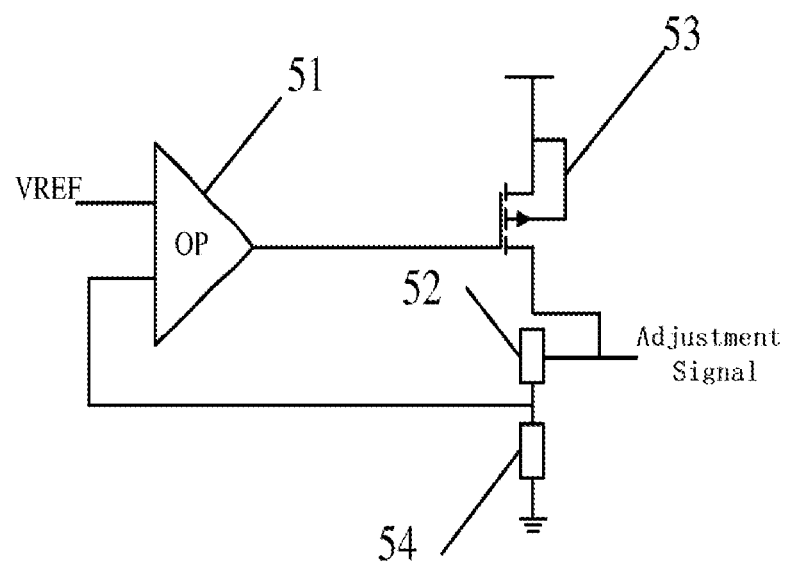
FIG. 7 is a schematic diagram of an adjustment unit according to an embodiment of the present disclosure.

In a possible implementation, as shown in FIG. 7, the adjustment unit 50 provided in the embodiment of the present disclosure includes a comparator 51, a sliding variable resistor 52, a fifth MOS transistor 53, and a third resistor 54.

A first input end of the comparator 51 is connected to a standard power supply, a second input end of the comparator 51 is connected to a second end of the sliding variable resistor 52, and an output end of the comparator 51 is connected to the gate electrode of the fifth MOS transistor 53. The source electrode of the fifth MOS transistor 53 is connected to a power supply, the drain electrode of the fifth MOS transistor 53 is connected to a sliding sheet of the sliding variable resistor 52. The sliding sheet of the sliding variable resistor 52 is connected to an output end of the comparison unit 40, and a second end of the sliding variable resistor 52 is connected to the third resistor 54. A second end of the third resistor 54 is connected to the ground.

A data acquisition system is provided in embodiments of the present disclosure with reference to FIGS. 1 to 7. The operating principle of the data acquisition system will be illustrated with reference to FIG. 1 below.

A signal is transmitted from the input end 1 of the signal transmission line 10 to an inversion unit (not shown) to obtain a signal with the desired waveform. The processed signal is output from the inversion unit and is successively passed through a plurality of first signal delay units 11 for delay transmission. During the transmission, a working state of the processing device 60 is detected. In response to a determination that the processing device 60 is in an idle state, an instruction signal for controlling an operating state of the switch unit (not shown) is sent by the processing device 60 to the clock unit 30, to generate a control signal. The control signal is then sent to the acquisition unit 20, such that the acquisition unit 20 is caused to perform signal acquisition, and the collected signals are then sent to the processing device 60 for signal processing.

During the data acquisition process, the number of the cycles of the standard signals is accumulated by the first adder (not shown) in the comparison unit 40 connected to the clock unit 30, and the number of periods of the control signals is accumulated by the second adder (not shown). Based on a ratio of the number as accumulated by the first adder and the number as accumulated by the second adder, a determination as to whether the delay of the first signal delay unit 11 and delay of the second delay unit 32 are offset from a predetermined duration. And based on the offset, an adjustment is performed on the position of the sliding sheet of the sliding variable resistor (not shown) of the adjustment unit 50, so as to change the contact position of the second end of the comparator (not shown) connected to the second end of the sliding variable resistor. Based on a comparison between the contact point and a standard voltage, potential of the sliding variable resistor is changed, thereby changing the voltage supplied to each unit in the signal transmission line 10 and the clock unit 30 connected to the sliding variable resistor, so that the ratio of the period of the control signal to the period of the standard signal is controlled to be within a predetermined threshold range.

Figure 8:
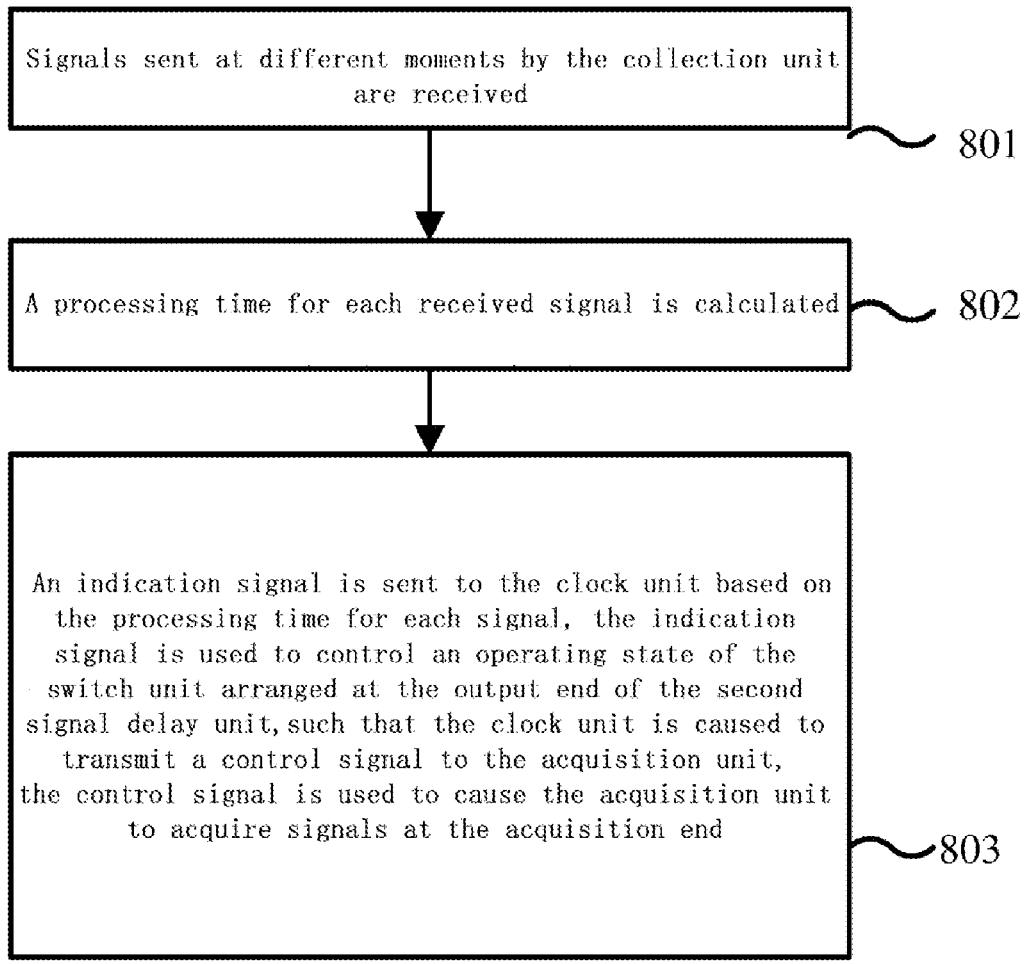
FIG. 8 is a schematic flowchart of a method for controlling a data acquisition system according to an embodiment of the present disclosure.

Based on the data collection system provided in the embodiments of the present disclosure as described in FIG. 1 to FIG. 7, an embodiment of the present disclosure provides a method for controlling the data collection system. As shown in FIG. 8, in some embodiments, the method includes the following steps:

At step 801: signals sent at different moments by the collection unit are received.

At step 802: a processing time for each received signal is calculated.

At step 803: an instruction signal is sent to the clock unit based on the processing time for each signal, the instruction signal is used to control an operating state of the switch unit arranged at the output end of the second signal delay unit, such that the clock unit is caused to transmit a control signal to the acquisition unit, the control signal is used to cause the acquisition unit to acquire signals at the acquisition end.

Based on the same invention concept, an embodiment of the present disclosure also provides a control device for the data acquisition system.

Figure 9:
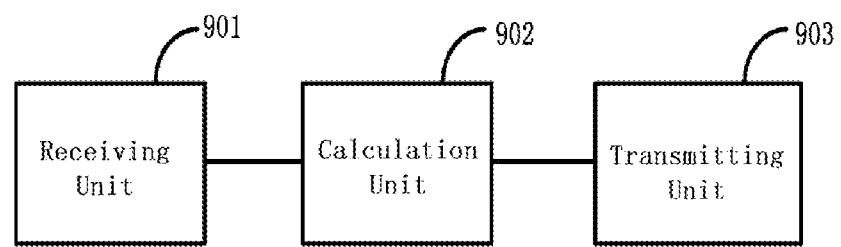
FIG. 9 is a schematic diagram of a control device for a data acquisition system according to an embodiment of the present disclosure.

As shown in FIG. 9, the control device for the data acquisition system according to an embodiment of the present disclosure includes:

a receiving unit 901, which is configured to receive signals sent at different moments by the acquisition unit;

a calculation unit 902, which is configured to calculate a processing time for each signal received; and a transmission unit 903, which is configured to transmit an instruction signal to the clock unit based on the processing time for each signal, the instruction signal is used to control an operating state of the switch unit arranged at the output end of the second signal delay unit, such that the clock unit is caused to transmit a control signal to the acquisition unit, the control signal is used to cause the acquisition unit to acquire signals at the acquisition end.

Figure 10:
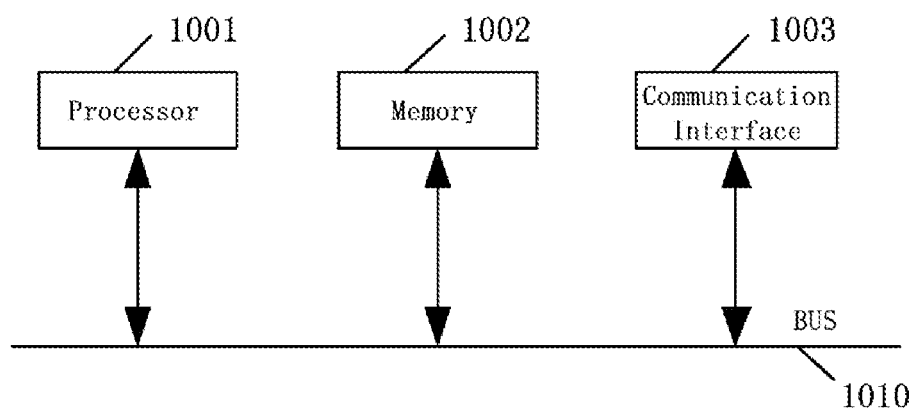
FIG. 10 is a schematic diagram of a control apparatus for a data acquisition system according to an embodiment of the present disclosure.

In addition, in some embodiments, the method and device for controlling the data acquisition system according to embodiments of the present disclosure described with reference to FIG. 8 and FIG. 9, are implemented by an apparatus for controlling the data acquisition system. FIG. 10 shows a schematic diagram of the hardware structure of the control apparatus of the data acquisition system according to an embodiment of the present disclosure.

In other embodiments, the control apparatus of the data acquisition system includes a processor 1001 and a memory 1002 storing computer program instructions.

Specifically, in some embodiments, the above-mentioned processor 1001 includes a central processing unit (CPU), or an Application Specific Integrated Circuit (ASIC), or maybe configured to implement one or more integrated circuits according to an embodiment of the present disclosure.

In some embodiments, the memory 1002 includes mass storage for data or instructions. As an example but not as a limitation, the memory 1002 may include a Hard Disk Drive (HDD), a floppy disk drive, a flash memory, an optical disk, a magneto-optical disk, a magnetic tape, or a Universal Serial Bus (USB) drive, or a combination thereof. Where appropriate, the storage 1002 may include removable or non-removable (or fixed) media. Where appropriate, the memory 1002 may be internal or external to the data processing device. In a particular embodiment, the memory 1002 is a non-volatile solid-state memory. In a particular embodiment, the memory 1002 includes a read-only memory (ROM). Where appropriate, the ROM is a mask-programmed ROM, a programmable ROM (PROM), an erasable PROM (EPROM), an electrically erasable PROM (EEPROM), an electrically rewritable ROM (EAROM), or a flash memory, or a combination thereof.

The processor 1001 reads and executes the computer program instructions stored in the memory 1002 to implement any one of the methods for controlling the data acquisition system in the above-mentioned embodiments.

In an example, the control apparatus of the data acquisition system may further include a communication interface 1003 and a bus 1010. As shown in FIG. 10, the processor 1001, the memory 1002, and the communication interface 1003 connect and communicate with each other through a bus 1010.

The communication interface 1003 is mainly used to implement communication between devices, units, and/or apparatus in the embodiments of the present disclosure.

The bus 1010 includes hardware, software, or both, and couples components of the control apparatus of the data acquisition system to each other. As an example but not as a limitation, the bus may include Accelerated Graphics Port (AGP) or other graphics bus, Enhanced Industry Standard Architecture (EISA) Bus, Front Side Bus (FSB), Hyper Transfer (HT) interconnect, Industry Standard Architecture (ISA) bus, Infinite Bandwidth Interconnect, Low Pin Count (LPC) Bus, Memory Bus, Micro Channel Architecture (MCA) Bus, Peripheral Component Interconnect (PCI) Bus, PCI-Express (PCI-X) Bus, Serial Advanced Technology Attachment (SATA) bus, Video Electronics Standards Association Local (VLB) bus or other suitable bus or a combination thereof. Where appropriate, the bus 1010 may include one or more buses. Although a specific bus is described and illustrated in the embodiments of the present disclosure, any suitable bus or interconnection is contemplated in the present disclosure.

In other embodiments, the apparatus for controlling the data acquisition system may execute the method for controlling the data acquisition system according to embodiments of the present disclosure based on the state of the processing unit in the data acquisition system, thereby achieving the combination of the method and device for controlling the data acquisition system described with reference to FIGS. 8-10 respectively.

In addition, the embodiment of the present disclosure may provide a computer-readable storage medium for implementing the method for controlling the data acquisition system according to the above-mentioned embodiments. The computer-readable storage medium has computer program instructions stored thereon, wherein, the computer program instructions, when executed by a processor, implement the method for controlling the data acquisition system according to any one of the above-mentioned embodiments.

It will be appreciated by a person having ordinary skills in the art that an embodiment of the present disclosure can be provided as a method, a system, or a computer program product. Therefore, the present disclosure may take the form of an entire hardware embodiment, an entire software embodiment, or an embodiment combining software and hardware. Moreover, the present disclosure may take the form of a computer program product implemented on one or more computer-usable storage media (including but not limited to disk storage, optical storage, etc.) containing computer-usable program codes.

The present disclosure is described with reference to flowcharts and/or block diagrams of methods, apparatus (system), and computer program products according to embodiments of the present disclosure. It should be understood that each process and/or block in the flowchart and/or block diagram, and the combination of processes and/or blocks in the flowchart and/or block diagram may be implemented by computer program instructions. These computer program instructions may be provided to the processor of a general-purpose computer, a special-purpose computer, an embedded processor, or other programmable data processing apparatus to generate a machine, so that the instructions executed by the processor of the computer or other programmable data processing apparatus produce means for realizing the functions specified in one or more flow charts and/or one or more block diagrams.

These computer program instructions may also be stored in a computer-readable memory that can direct a computer or other programmable data processing apparatus to operate in a specific manner, so that the instructions stored in the computer-readable memory produce an article of manufacture including instruction devices that implement the functions specified in one or more flow charts and/or one or more block diagrams.

These computer program instructions may also be loaded on a computer or other programmable data processing apparatus, so that a series of operation processes are executed on the computer or other programmable apparatus to generate computer-implemented processing, so that the instructions executed on the computer or other programmable apparatus provide steps for realizing the functions specified in one or more flows of the flowchart and/or one or more blocks of the block diagram.

Apparently, a person having ordinary skills in the art may make various modifications and alterations to the present disclosure without departing from the spirit and scope of the present disclosure. It is intended to include all such modifications and alterations in so far as they come within the scope of the appended claims or the equivalents thereof.

The invention claimed is:

1. A data acquisition system, comprising:
   a signal transmission line comprising a plurality of first signal delay units connected in series, an output end of each of the first signal delay units forming an acquisition end;
   a plurality of acquisition units each corresponding to a respective one of the first signal delay units,
      wherein in each pair of a corresponding acquisition unit and a first signal delay unit, the acquisition unit is connected to the acquisition end of the first signal delay unit, to collect signals at the acquisition end;
   a clock unit connected to each of the acquisition units, the clock unit comprising a first inversion unit and a plurality of second signal delay units,
      wherein the first inversion unit and the plurality of second signal delay units are connected in series, the second signal delay unit are structurally the same as the first signal delay unit, and the clock unit is configured to generate a control signal for controlling a time for signal acquisition of the acquisition unit;
   a comparison unit connected to the clock unit, the comparison unit being configured to compare a period of the control signal with a period of a standard signal, and to generate an adjustment signal according to a result of the comparison; and
   an adjustment unit connected to the comparison unit, the adjustment unit being configured to adjust a supply voltage for the signal transmission line and the clock unit based on the adjustment signal, such that a ratio of the period of the control signal to the period of the standard signal is within a predetermined threshold range.

2. The data acquisition system according to claim 1, wherein an amount of the first signal delay units connected in series in the signal transmission line is equal to an amount of the second signal delay units connected in series in the clock unit.

3. The data acquisition system according to claim 1, wherein the clock unit further comprises a switch unit, an output end of any one of the second signal delay units is connected to the switch unit, and the switch unit is configured to control a connection of a second signal delay unit with an input end of the first inversion unit.

4. The data acquisition system according to claim 1, wherein the comparison unit comprises a first adder, a second adder, and a comparator unit, and wherein,
  the first adder is configured to receive clock signals sent by a preset clock device, and to accumulate an amount of the clock signals;
  the second adder is configured to receive the control signals and to accumulate an amount of the control signals;
  the comparator unit is connected to the first adder and the second adder respectively, and is configured to compare the accumulated amount of the clock signals of the first adder and the accumulated amount of the control signals of the second adder, and to generate an adjustment signal based on the comparison.

5. The data acquisition system according to claim 4, wherein the adjustment unit comprises a comparator, a sliding variable resistor, a metal-oxide-semiconductor field-effect, MOS transistor, and a first resistor, and wherein,
  a first input end of the comparator is connected to a standard power supply, a second input end of the comparator is connected to a second end of the sliding variable resistor, and an output end of the comparator is connected to gate electrode of the MOS transistor;
  a source electrode of the MOS transistor is connected to a power supply, and a drain electrode of the MOS transistor is connected to a sliding sheet of the sliding variable resistor;
  the sliding sheet of the sliding variable resistor is connected to an output end of the comparator unit, and a second end of the sliding variable resistor is connected to the first resistor; and
  a second end of the first resistor is connected to ground.

6. The data acquisition system according to claim 1, wherein an input end of the signal transmission line comprises a second inversion unit that is structurally the same as the first inversion unit.

7. A method for controlling a data acquisition system, the method comprising:
  receiving signals sent at different moments by an acquisition unit of the data acquisition system;
  calculating a processing time for each received signal; and
  transmitting an instruction signal to a clock unit of the data acquisition unit based on the processing time for each signal;
  wherein the instruction signal is used to control an operating state of a switch unit arranged at an output end of a signal delay unit of the data acquisition unit, such that the clock unit is caused to transmit a control signal to the acquisition unit, and the control signal is used to control the acquisition unit to acquire a signal at an acquisition end.

8. A control device for a data acquisition system, comprising:
  a receiving unit configured to receive signals sent at different moments by an acquisition unit;
  a calculation unit configured to calculate a processing time for each received signal; and
  a transmission unit configured to transmit an instruction signal to a clock unit based on the processing time for each signal;
  wherein the instruction signal is configured to control an operating state of a switch unit arranged at an output end of a signal delay unit, such that the clock unit is caused to transmit a control signal to the acquisition unit, and the control signal is configured to control the acquisition unit to acquire a signal at an acquisition end.

9. A control apparatus for a data acquisition system, comprising:
  at least one processor, at least one memory, and computer program instructions stored in the memory, wherein the computer program instructions, when executed by the at least one processor, cause the at least one processor to perform operations comprising:
    in response to receiving signals sent at different moments by an acquisition unit of the data acquisition system, calculating a processing time for each received signal; and
    transmitting an instruction signal to a clock unit of the data acquisition unit based on the processing time for each signal;
    wherein the instruction signal is used to control an operating state of a switch unit arranged at an output end of a signal delay unit of the data acquisition unit, such that the clock unit is caused to transmit a control signal to the acquisition unit, and the control signal is used to control the acquisition unit to acquire a signal at an acquisition end.

10. A non-transitory computer-readable storage medium having computer program instructions stored thereon, wherein, the computer program instructions, when executed by a processor, cause the processor to perform operations comprising:
  in response to receiving signals sent at different moments by an acquisition unit of a data acquisition system, calculating a processing time for each received signal; and
  transmitting an instruction signal to a clock unit of the data acquisition unit based on the processing time for each signal;
  wherein the instruction signal is used to control an operating state of a switch unit arranged at an output end of a signal delay unit of the data acquisition unit, such that the clock unit is caused to transmit a control signal to the acquisition unit, and the control signal is used to control the acquisition unit to acquire a signal at an acquisition end.

* * * * *